United States Patent [19]

Mizushima

[11] Patent Number: 4,857,909

[45] Date of Patent: Aug. 15, 1989

[54] IMAGE DISPLAY APPARATUS

[75] Inventor: Tatsuhiko Mizushima, Gumma, Japan

[73] Assignee: Mitsubishi Denki Kabushiki Kaisha, Tokyo, Japan

[21] Appl. No.: 191,733

[22] Filed: May 2, 1988

Related U.S. Application Data

[63] Continuation of Ser. No. 841,191, Mar. 19, 1986, abandoned.

[51] Int. Cl.[4] .................................... H04N 7/00

[52] U.S. Cl. .................................... 340/793; 340/703; 340/723; 358/447

[58] Field of Search .................................... 358/75, 283, 284; 340/731, 734, 747, 723

[56] References Cited

U.S. PATENT DOCUMENTS 3,293,614 12/1966 Fenimore et al. .................. 340/703
4,092,666 5/1978 Rhodes et al. .................. 358/10
4,236,175 11/1980 Groothuis .................. 358/30
4,308,553 12/1981 Roetling .................. 358/75
4,451,824 5/1984 Thayer et al. .................. 340/720
4,520,358 5/1985 Makino .................. 340/799
4,688,031 8/1987 Haggerty .................. 340/793
4,739,397 4/1988 Hayashi .................. 358/75 X

*Primary Examiner*—Thomas H. Tarcza
*Assistant Examiner*—Bernarr Earl Gregory
*Attorney, Agent, or Firm*—Bernard, Rothwell & Brown

[57] ABSTRACT

An image display apparatus includes a conversion circuit which makes 1-bit information in display memory correspondence to a plurality of dot data on the display screen, so that more sophisticated image information than the ability of a display device is expanded into a bright/dark dot pattern. The apparatus enables an application display program oriented to a higher-graded display device to be displayed in a pseudo sense on a lower-graded display device.

4 Claims, 4 Drawing Sheets

| INPUT | | | OUTPUT | |
|---|---|---|---|---|
| TERMINAL 13 | TERMINAL 11 | | TERMINAL 12 | |
| CTRL | Co | C1 | Do | D1 |
| X | 0 | 0 | 0 | 0 |
| 0 | 1 | 0 | 1 | 0 |
| 1 | 1 | 0 | 0 | 1 |
| X | 0 | 1 | 0 | 1 |
| X | 1 | 1 | 1 | 1 |

X: IRRELEVANT INPUT

IMAGE DISPLAY APPARATUS

This is a continuation of application Ser. No. 841,191 filed Mar. 19, 1986, now abandoned.

BACKGROUND OF THE INVENTION

1. Field of the Invention

The present invention relates to an image display apparatus and, particularly to an image display apparatus of dot-matrix type practiced as a CRT display unit or a liquid crystal display unit.

2. Description of the Prior Art

An example of this type of display apparatus shown in FIG. 1 is disclosed in U.S. Pat. No. 4,520,358. The arrangement shown includes a central processing unit and associated circuitry (will be termed simply "CPU" hereinafter) 1, an image display memory for holding image and color information (will be termed simply "V-RAM" hereinafter) 2, a dot-matrix image display device such as a CRT unit or liquid crystal panel and associated circuitry (will be termed simply "display device" hereinafter) 3, and a display control circuit 4 for controlling the V-RAM 2 and display device 3.

In the above arrangement, when an image is displayed on the display device 3, the CPU 1 writes the image information into the V-RAM 2. The image information written in the V-RAM 2 is read out sequentially under control of the display control circuit 4 and delivered to the display device 3. Upon receiving the information, the display device 3 display it as a pattern of dots in specified brightness and colors. The V-RAM 2 has its information storage locations corresponding to the dots on the display device 3 simply on a bit-by-bit basis, and a bit pattern which the CPU 1 has written into the V-RAM 2 is just transferred to the screen of the display device 3, and an assembly of dots in respective brightness is visualized as an image.

However, the conventional image display system constructed as described above does not operate correctly for displaying an image provided by the CPU 1 when it connects with a display device having a different performance than that of the display device which matches the application program run by the CPU 1. For example, if a personal computer system is once constructed including a monochrome liquid crystal display panel, it cannot run an application program oriented to the color CRT display device.

SUMMARY OF THE INVENTION

It is a primary object of this invention to provide an image display apparatus which overcomes the foregoing prior art deficiency.

Another object of this invention is to provide an image display apparatus which is operative to display an image in a pseudo sense when a higher-resolution image display device is included in the system.

Other objects and advantages of the present invention will become more apparent from the following detailed description taken in conjunction with the accompanying drawings.

DESCRIPTION OF THE PREFERRED EMBODIMENT

Figure 1:
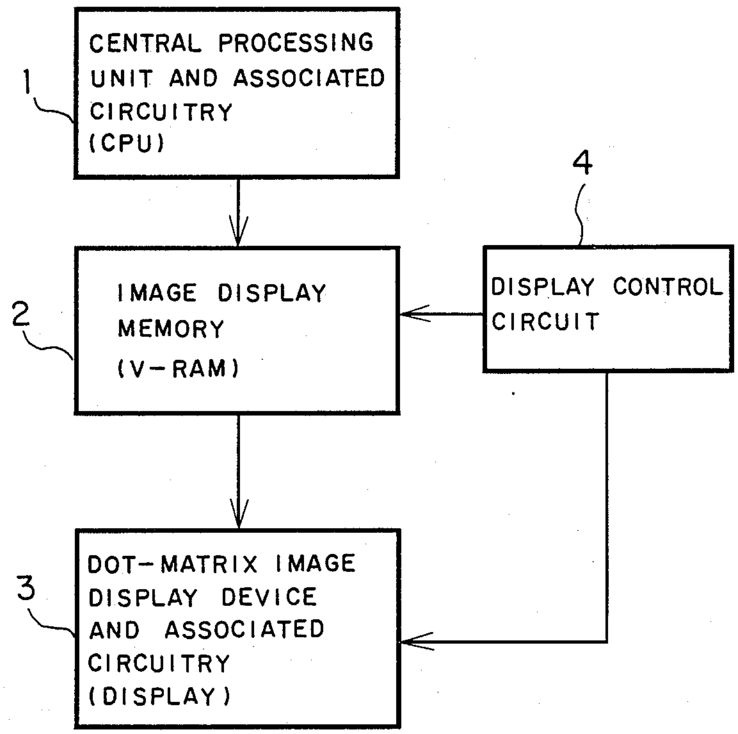
FIG. 1 (PRIOR ART)
FIG. 1 is a block diagram showing the arrangement of the conventional image display apparatus.
Figure 2:
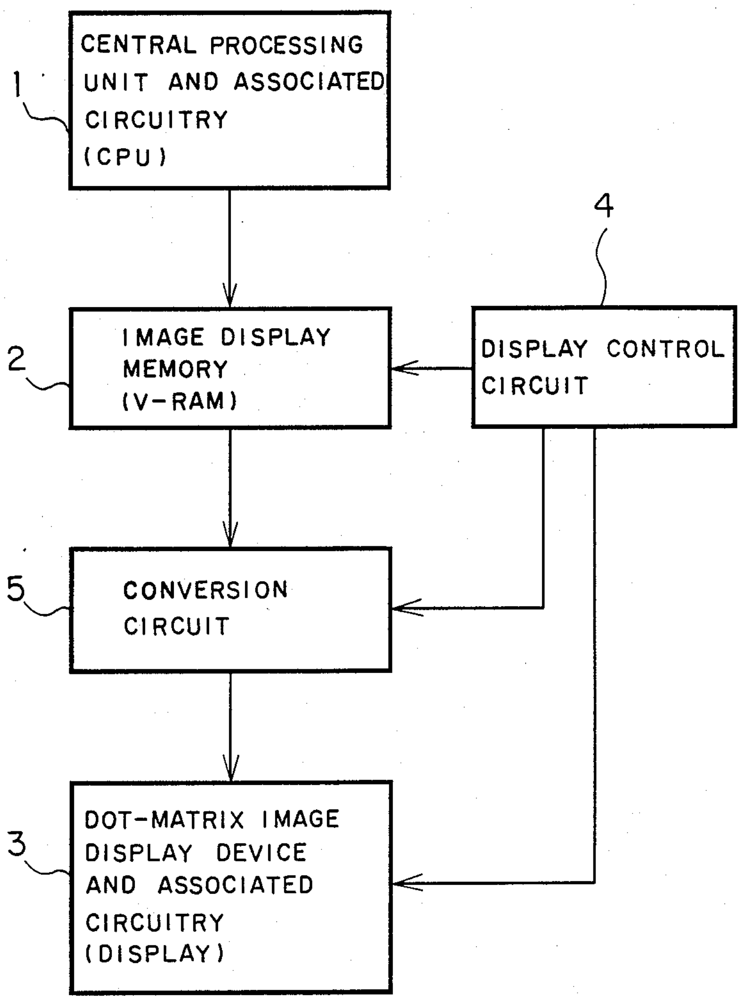
FIG. 2 is a block diagram showing the arrangement of the image display apparatus embodying the present invention.

An embodiment of this invention will now be described with reference to FIG. 2, in which the same functional blocks as those of FIG. 1 are referred to by the common numerals. In the figure, reference number 1 denotes a CPU which runs application programs oriented to a 4-color display device with a resolution of 320-by-200 dots (medial resolution), 2 denotes a V-RAM for holding 4-color image information of the medial resolution. 3 denotes a monochrome display device with a resolution of 640-by-200 dots (high resolution), 4 denotes a display control circuit for controlling the V-RAM 2 and display device 3, and 5 denotes a conversion circuit for converting 4-color medial-resolution image information into monochrome high-resolution image information.

Figure 3:
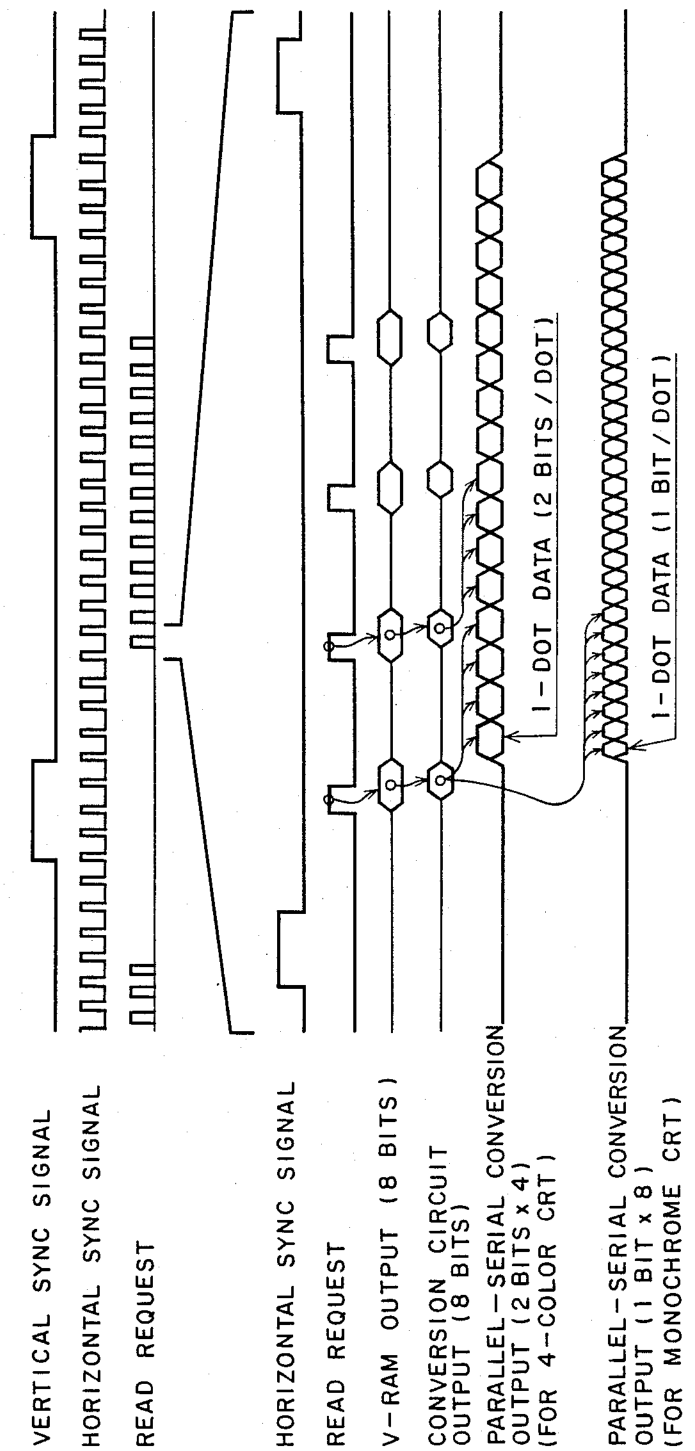
FIG. 3 is a timing chart used to explain the operation of the apparatus shown in FIG. 2.

The operation of the foregoing system arrangement will be described in the following. The CPU 1 is a general microcomputer system centered by a microprocessor and including a data memory, program memory, printer interface, floppy disk interface and so on linked through the buses. The V-RAM 2 is a memory device which is accessed for reading and writing in a random addressing manner by the CPU 1 through similar buses to those used for the above-mentioned components such as the data memory, and is also accessed for reading in a substantially sequential manner at a certain orderly timing by the display control circuit 4. The V-RAM 2 holds image information in dot units, i.e., monochrome image information is held in 1 bit/dot and color image information is held in 2 bits/dot. When it is intended to change the image displayed on the display device, the CPU 1 rewrites the contents of the V-RAM 2 through the bus at an arbitrary time point. In case a CRT is used as a display device the display control circuit 4 generates the horizontal and vertical synchronizing signals and issues the address of the display position and the read request signal to the V-RAM 2 at the timing when the CRT 3 necessitates the image information. In response to the given address and read request, the V-RAM 2 reads out addressed image information along the stored image information, and delivers it to the conversion circuit 5. Each piece of image information is generally formatted in a 8-bit byte which is enough to carry 4-color image information for four dots. The conversion circuit 5 receives a 1-bit CTRL signal from the display control circuit 4 indicative of whether the received image information is to be displayed on an even-numbered raster or an odd-numbered raster, implements the code conversion stated in the truth table of FIG. 5 according to the CTRL signal, and delivers the output as monochrome image information for eight dots to the CRT 3. The display device 3 has its associated circuit converting the received parallel signal into a serial signal having a frequency eight times the input signal frequency, and it is applied to the CRT. The CRT device 3 displays the serial image information on the screen by being timed by the horizontal and vertical synchronizing signals provided by the display control circuit 4. In consequence, the image information held in the V-RAM 2 is visualized on the CRT screen. These operations are shown in the timing chart in FIG. 3.

Figures 4, 5:
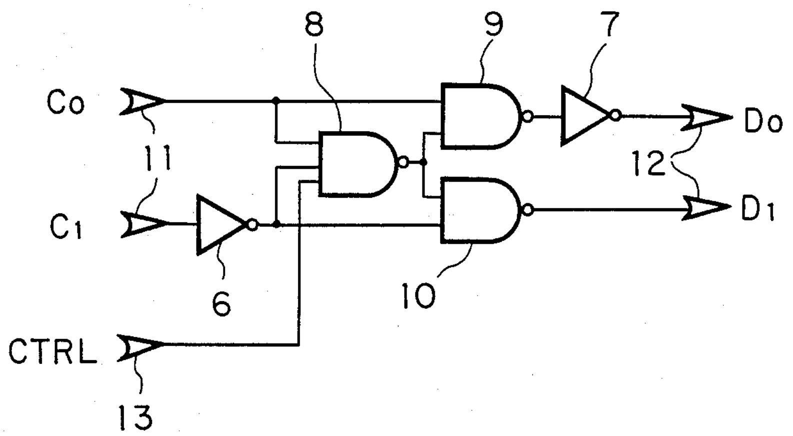
FIG. 4 is a schematic diagram showing the details of the conversion circuit in FIG. 2.
FIG. 5 is a truth table for the logic circuit shown in FIG. 4.

FIG. 4 is a schematic logic circuit diagram of the conversion circuit used in this embodiment. In the circuit arrangement, reference numbers 6 and 7 denote inverters, 8, 9 and 10 are NAND gates, and 11 denotes input terminals for receiving a set of image information read out of the V-RAM 2. The two-bit inputs C0 and C1 in combination express four colors. The conversion circuit 5 has a pair of output terminals 12 providing 2-bit outputs D0 and D1, which logical levels determine the brightness of two corresponding dots on the display device 3. Reference number 13 denotes an input terminal for receiving the control signal which specifies the conversion mode, and in this embodiment it is derived from the low-order one bit of the vertical dot counter in the display control circuit.

In the foregoing arrangement, the CPU 1 runs an application program oriented to a 4-color medial-resolution display device. In this case, however, the application program transfers image information in 4-color dot-matrix format to the V-RAM 2 without being aware that the display device 3 is actually of the monochrome high-resolution type. The image information is read out sequentially under control of the display control circuit 4 and received at the image input terminals 11 of the conversion circuit 5.

The conversion circuit 5 converts the color information for four colors into monochrome color information for two dots in accordance with the truth table in FIG. 5. Namely, color information in the form of C0=1, C1=1 is converted into image information representing "ON" state for both of two dots. Color information C0=0, C1=1 and color information C0=1, C1=0 each represent two dots, i.e., one "ON" dot and one "OFF" dot, and possible combinations ON-OFF and OFF-ON cannot be distinguished visually on the display screen.

The conversion circuit 5 receives the low-order one bit of the vertical dot counter in the display control circuit 4 as the CTRL signal and uses it for conversion. This signal allows the conversion circuit 5 to distinguish whether the dots are displayed on an even-numbered line or odd-numbered line counted from the top on the display screen. Color information C0=1, C1=0 distinguished to be even-numbered dots is converted into information of two ON and OFF dots, while the color information distinguished to be odd-numbered dots is converted into information of two OFF and ON dots. Accordingly, when a wide screen area is colored by C0=1, C1=0, it is displayed as a checker. Color information C0=0, C1=1 is converted into image information of two OFF and ON dots irrespective of the logical level of the CTRL signal, and its application to a wide area of the screen results in a display of vertical stripes. This information converting operation enables the reproduction of 4-color display in a pseudo-sense on the monochrome display device 3.

Figure 6:
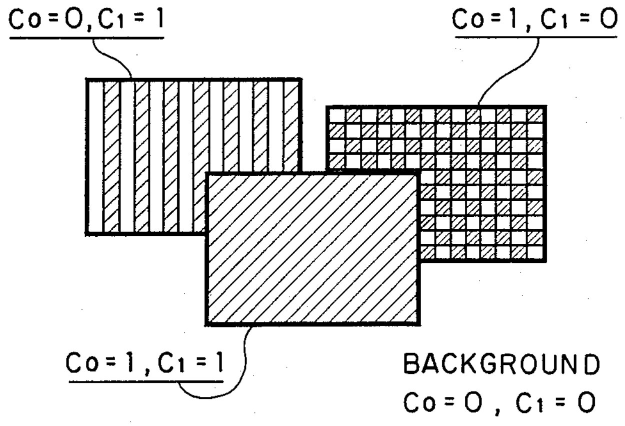
FIG. 6 is an illustration showing a sample display produced by this embodiment.

FIG. 6 shows a display sample produced by this embodiment. The display is given a background in a color specified by C=0, C1=0, and it is overlaid by three rectangles in colors C0=0, C1=1, C0=1, C1=1 and C0=1, C1=0 from left to right. When this image is displayed on a monochrome display screen through the operation of this invention, it is displayed as three rectangular patterns of vertical stripes, black plain, and checker from left to right as shown in FIG. 6. Accordingly, an application program oriented to 4-color display can be useful for the monochrome display device 3, and color information in the program can be distinguished visually.

Although the foregoing embodiment is intended to convert 4-color medial resolution image information into monochrome high-resolution image information to be displayed on a monochrome display device, the present invention can, of course, be applied to other cases of displaying on a display device image information which is more sophisticated than the ability of the display device through the conversion of the original information into another image information which can conveniently be displayed on the display device, e.g., through the conversion from 16-color image information into 8-color image information, with the same effectiveness as of the foregoing embodiment.

According to the present invention, as described above, the provision of the conversion circuit which transforms part of image information into binary dot data allows an application program oriented to a higher-graded display device to be displayed on a lower-graded display device without the need of any modification for the application program.

What is claimed:

1. An image display apparatus utilizing color image information for generating a monochrome image, comprising:

a central processing unit;

an image display memory for receiving color image information from the central processing unit and for storing the color image information in successive pluralities of bits of color image information wherein each plurality of bits defines a color of one corresponding pixel of a color image;

a display control circuit for cyclically reading the successive pluralities of bits of color image information out of the image display memory;

a conversion circuit for converting each plurality of bits of color image information read out of the image display memory into a corresponding pattern of bits of monochrome image information in which successive bits correspond to successive pixels in a monochrome image and in which different patterns of the bits of monochrome image information correspond to different colors defined by the color image information; and monochrome video display means receiving the monochrome image information and for producing a monochrome video image from the monochrome image information.

2. An image display apparatus as claimed in claim 1 wherein the color image information corresponds to a medium resolution color image, and the monochrome image information corresponds to a high resolution mononchrome image.

3. An image display apparatus as claimed in claim 1 wherein each pixel of the color image is represented by two bits of color image information defining four color bit codes to thus enable each pixel of a color image to have one of four predetermined colors; and said conversion circuit includes means for converting one color bit code into two successive dark monochrome bits, a second color bit code into two successive light monochrome bits, a third color bit code into two alternating dark and light monochrome bits wherein the monochrome bits alternate in the same manner on adjacent horizontal lines of the display means to produce vertical bars on the display means within a display area defined by the third color, and a fourth color bit code into two alternating dark and light bits wherein the monochrome bits alternate in an opposite manner on adjacent horizontal lines of the display means to produce a checkered pattern on the display means within a display area defined by the fourth color.

4. An image display apparatus as claimed in claim 3 wherein the display control circuit generates a control signal indicating whether a horizontal display line being generated is odd or even, and the conversion circuit includes gate means responsive to the control signal to alternate dark and light monochrome bits generated from the third color bit code in the opposite manner for the respective odd and even display lines.

* * * * *

UNITED STATES PATENT AND TRADEMARK OFFICE

CERTIFICATE OF CORRECTION

PATENT NO. : 4,857,909

DATED : August 15, 1989

INVENTOR(S) : TATSUHIKO MIZUSHIMA

It is certified that error appears in the above-identified patent and that said Letters Patent is hereby corrected as shown below:

Col. 3, line 62, "C=0" should be --C0=0--.

Col. 4, line 56, "mononchrome" should be --monochrome--.

Signed and Sealed this

Eleventh Day of September, 1990

*Attest:*

HARRY F. MANBECK, JR.

*Attesting Officer* *Commissioner of Patents and Trademarks*